S. M. STEVENS.
MACHINE FOR MAKING BARBED WIRE FENCING.

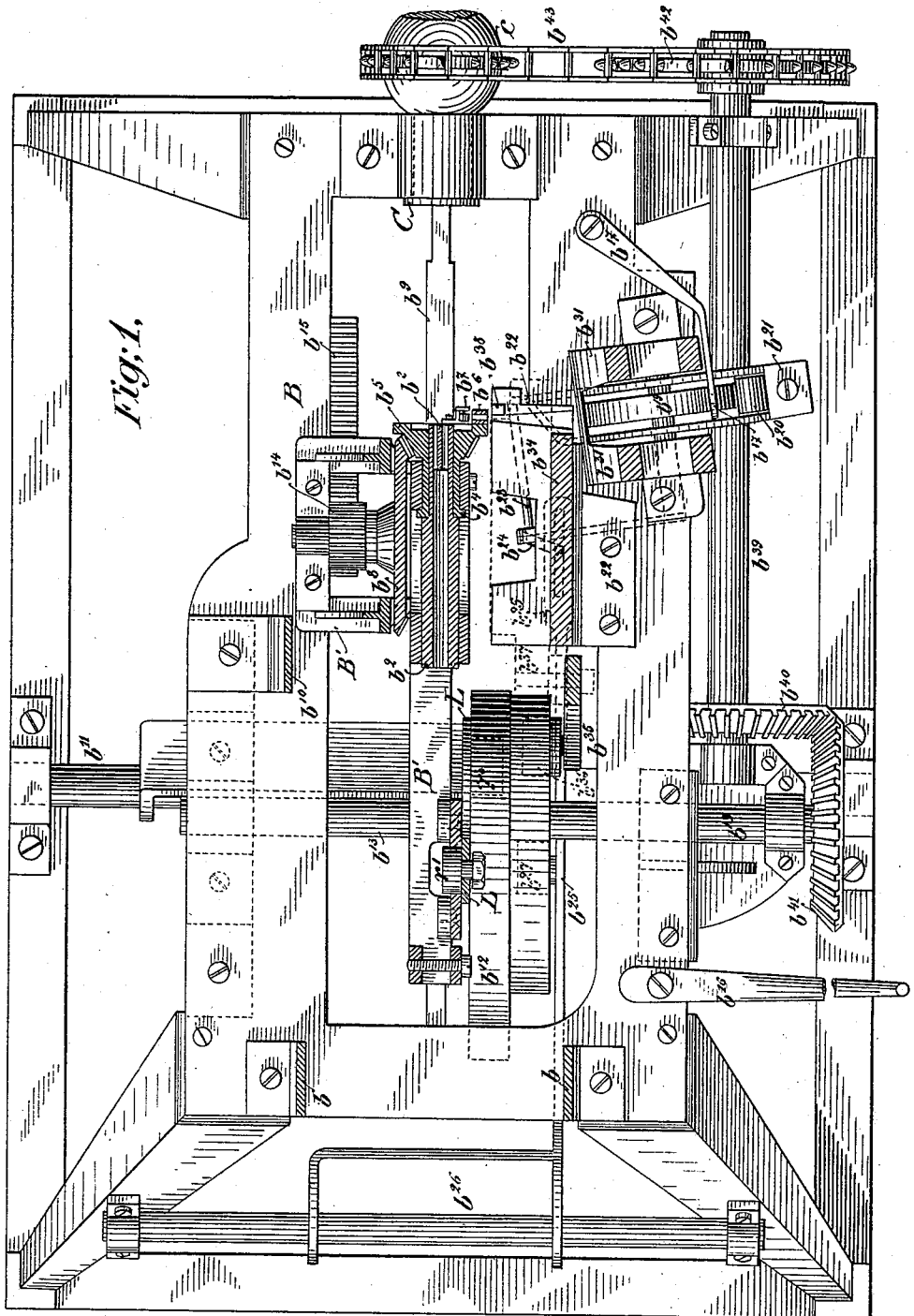

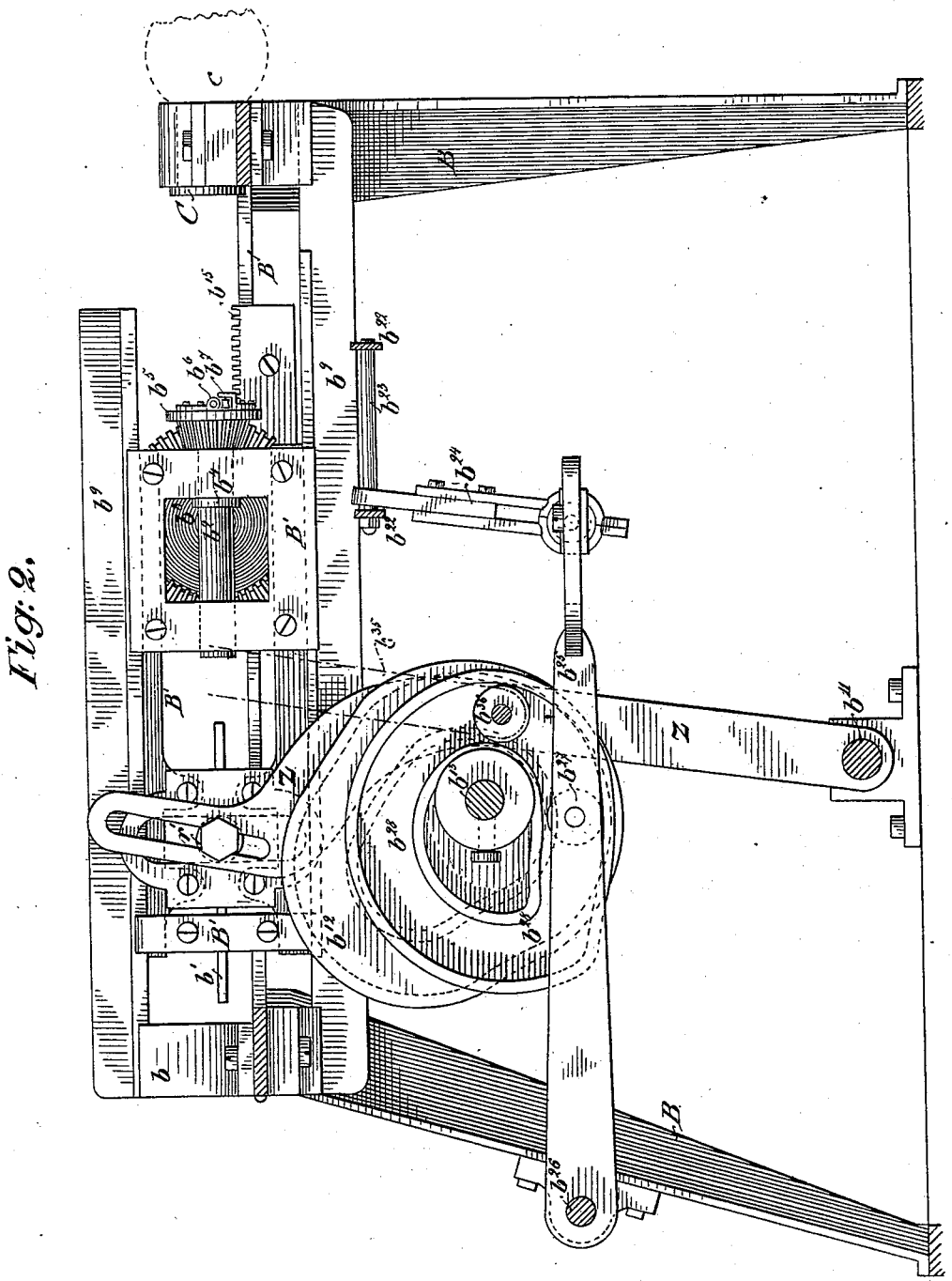

No. 253,781.  Patented Feb. 14, 1882.

WITNESSES:
Forde R. Smith
Edmund Adcock

INVENTOR:
Sidney M. Stevens
by Munday & Evarts
Attys

S. M. STEVENS.
MACHINE FOR MAKING BARBED WIRE FENCING.
No. 253,781. Patented Feb. 14, 1882.
9 Sheets—Sheet 4.
Fig. 4.
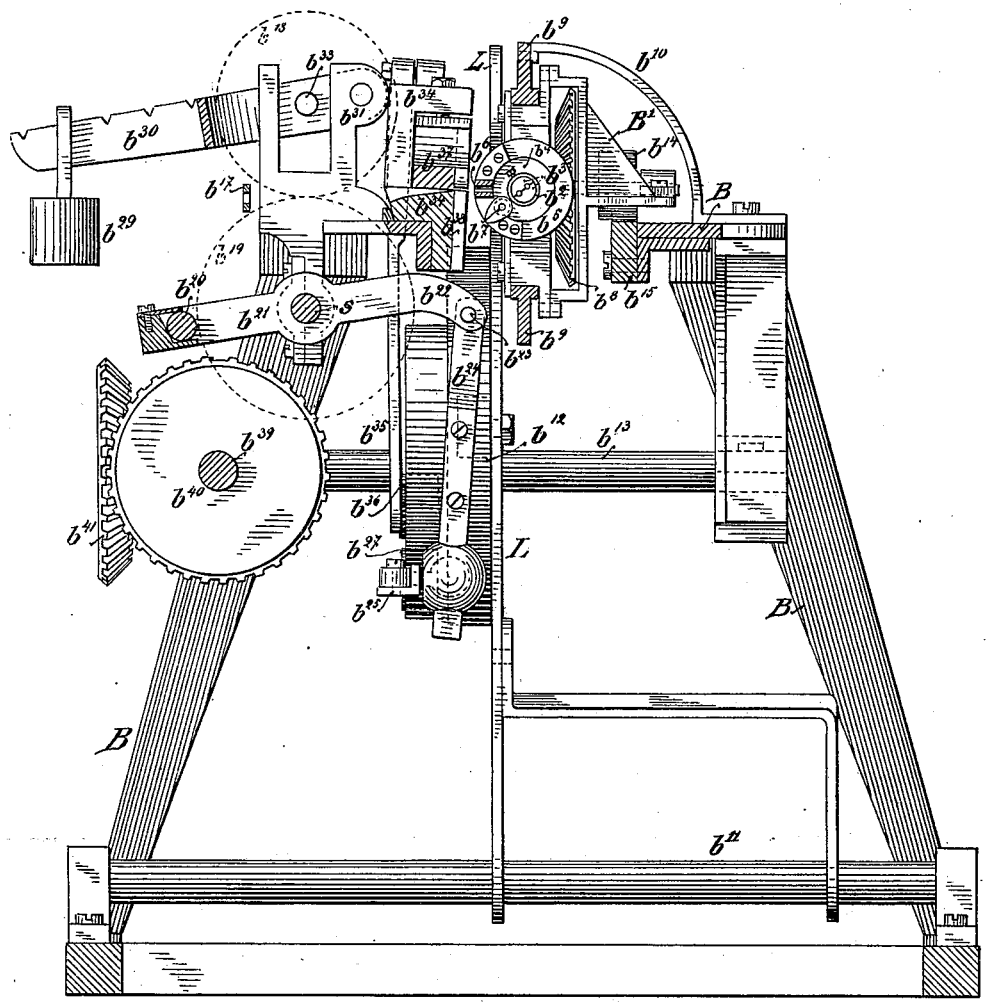
Fig. 13ª.
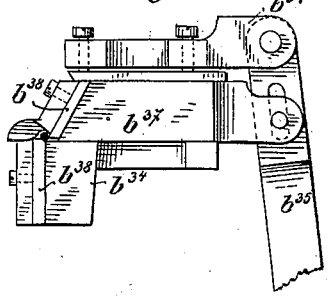
WITNESSES
Ernest Abshagen
C. J. Hedrick
By his Attorney
INVENTOR
Sidney M. Stevens
A. Pollok

S. M. STEVENS.
MACHINE FOR MAKING BARBED WIRE FENCING.

No. 253,781. Patented Feb. 14, 1882.

9 Sheets—Sheet 5.

WITNESSES: Forde R. Smith, Edmund Adcock

INVENTOR: Sidney M. Stevens by Munday & Evarts Attys

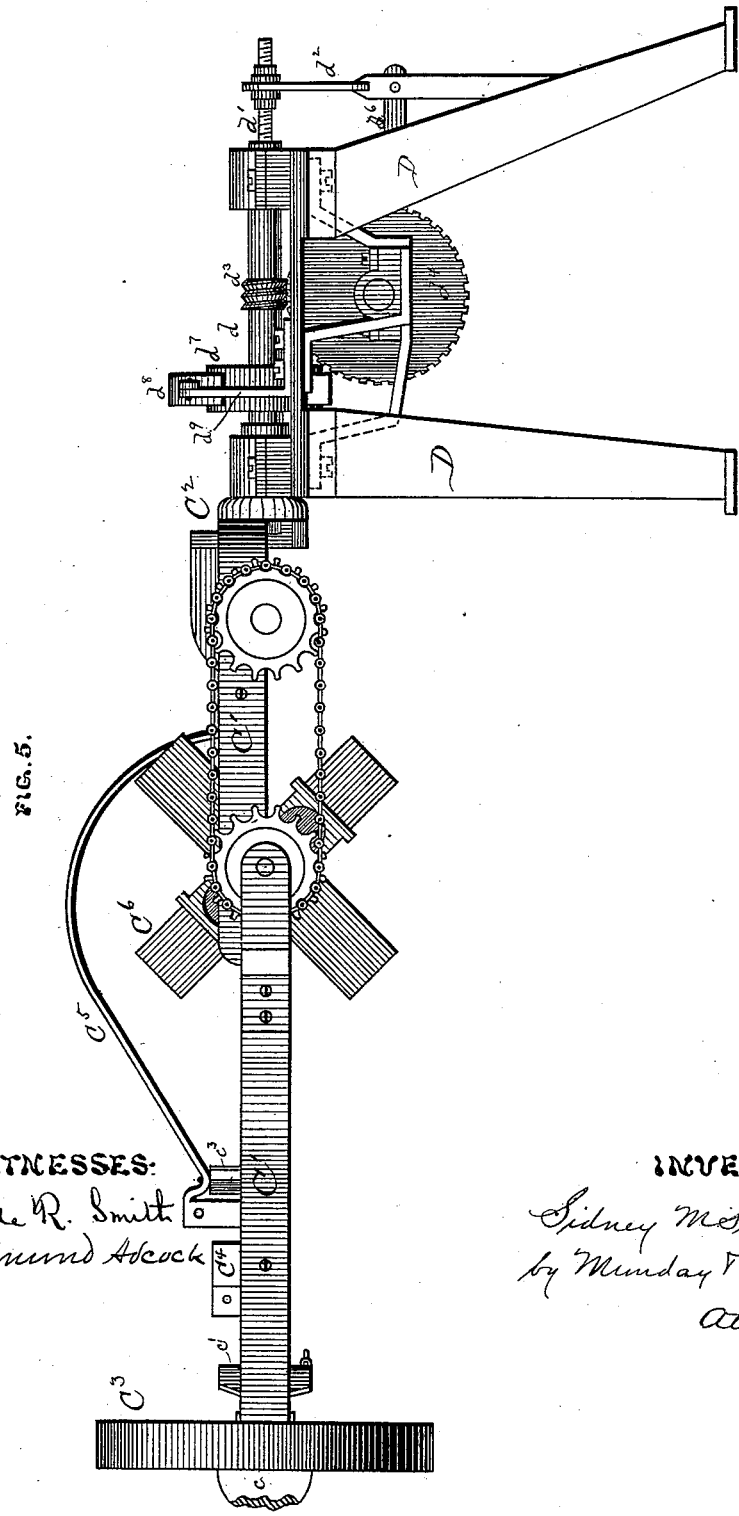

S. M. STEVENS.
MACHINE FOR MAKING BARBED WIRE FENCING.
No. 253,781. Patented Feb. 14, 1882.
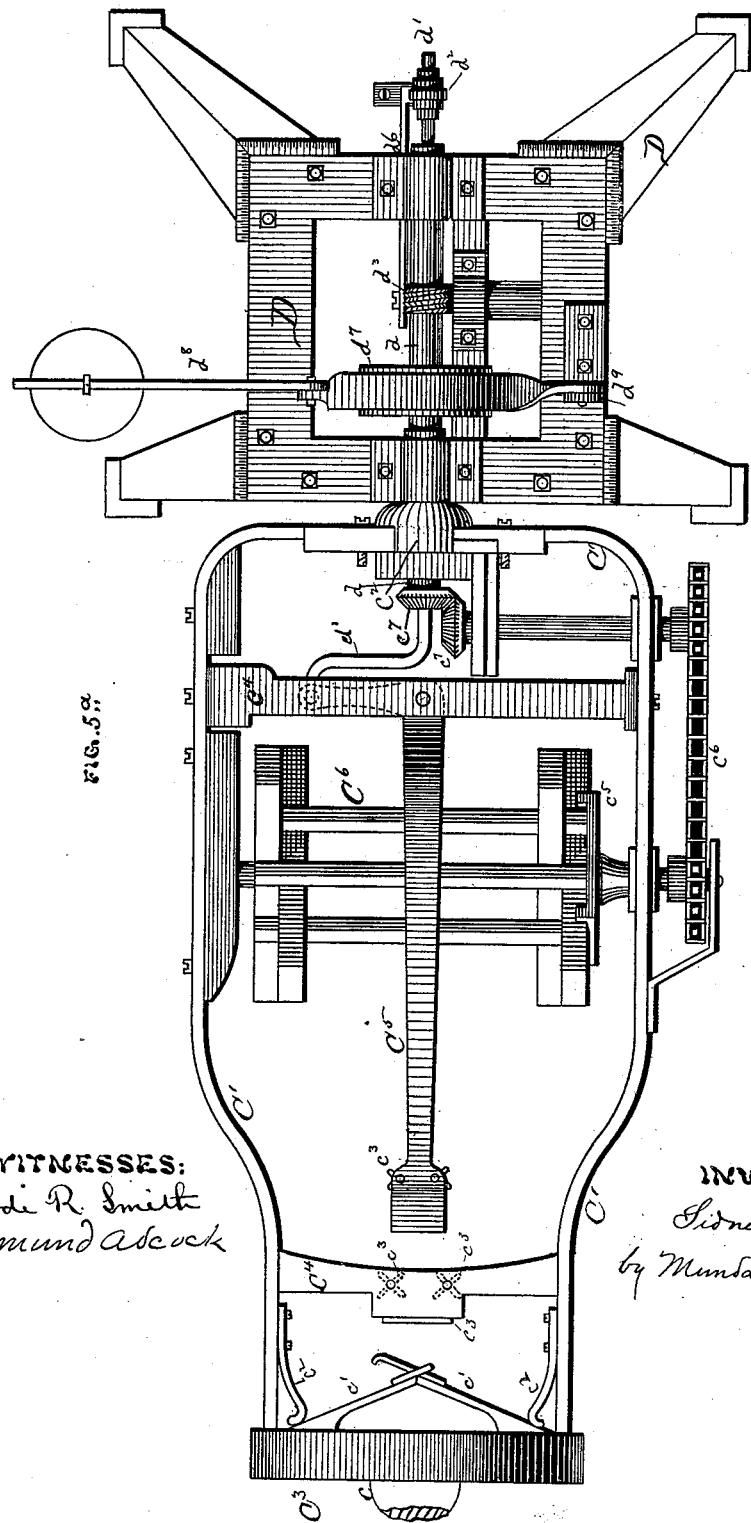
WITNESSES:
Ford R. Smith
Edmund Adcock
INVENTOR:
Sidney M. Stevens
by Munday & Evarts
Attys S. M. STEVENS
MACHINE FOR MAKING BARBED WIRE FENCING.
No. 253,781.  Patented Feb. 14, 1882.
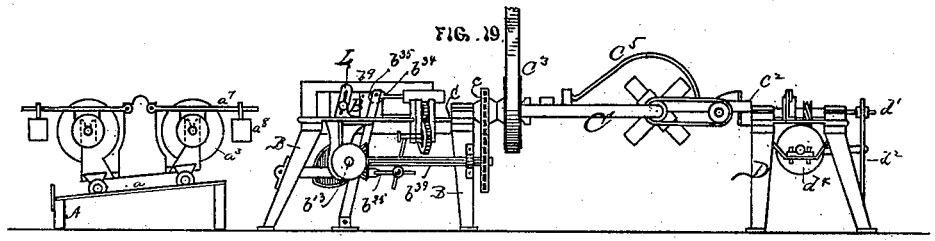
FIG. 19.
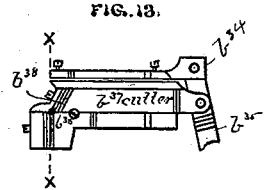
FIG. 13.
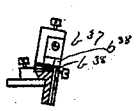
FIG. 14.
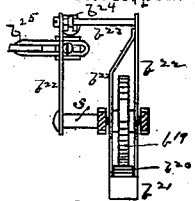
FIG. 11 (plan)
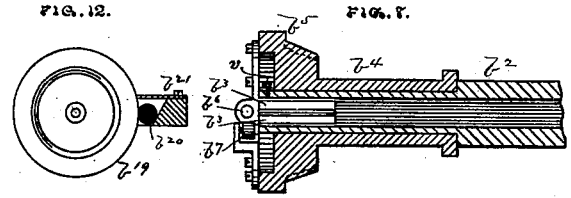
FIG. 12.  FIG. 7.
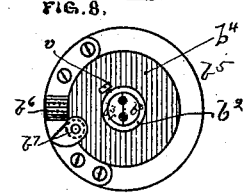
FIG. 8.
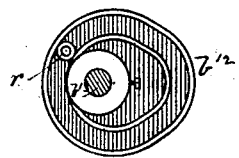
FIG. 9.
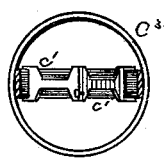
FIG. 15.
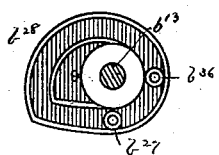
FIG. 10.
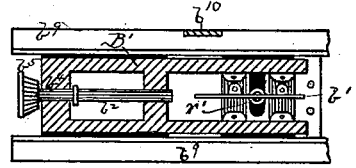
FIG. 17.
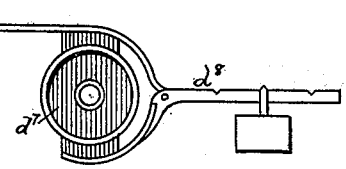
FIG. 16.
FIG. 18.
WITNESSES:
Forde R. Smith
Edmund Adcock
INVENTOR:
Sidney M. Stevens
by Munday & Evarts
attys

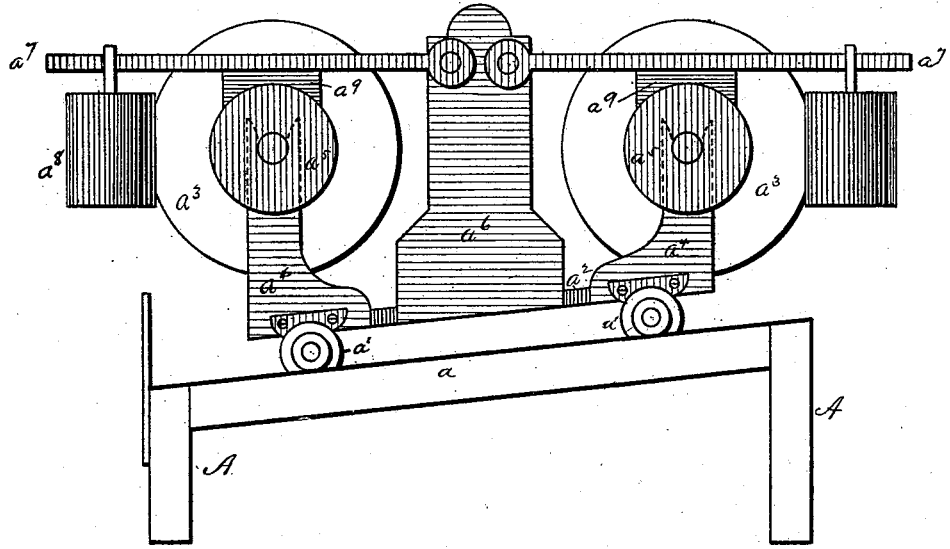
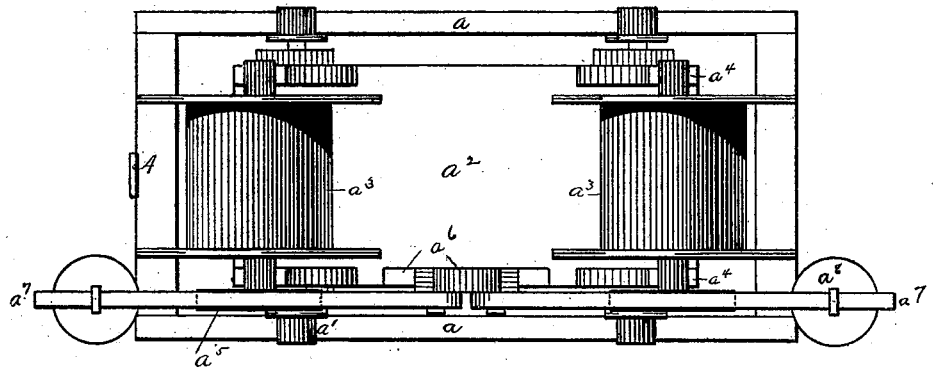

UNITED STATES PATENT OFFICE.

SIDNEY M. STEVENS, OF ELWOOD, ILL., ASSIGNOR, BY MESNE ASSIGNMENTS, TO WASHBURN & MOEN MANUFACTURING COMPANY, OF WORCESTER, MASS., AND ISAAC L. ELLWOOD, OF DE KALB, ILL.

MACHINE FOR MAKING BARBED-WIRE FENCING.

SPECIFICATION forming part of Letters Patent No. 253,781, dated February 14, 1882.

Application filed December 8, 1877.

*To all whom it may concern:*

Be it known that I, SIDNEY M. STEVENS, of Elwood, in the county of Will and State of Illinois, have invented Improvements in Machines for Making Barbed-Wire Fencing, whereof the following specification is a full description.

This invention relates to machines for making automatically barbed-wire fencing, and more particularly to machines for making twisted-wire fencing having two or more main fence-wires with the barbs inserted between and wrapped around the said fence-wires, the latter being twisted together between the barbs.

The accompanying drawings, which form a part of this specification, represent a machine constructed in accordance with the invention.

Figure 2A:
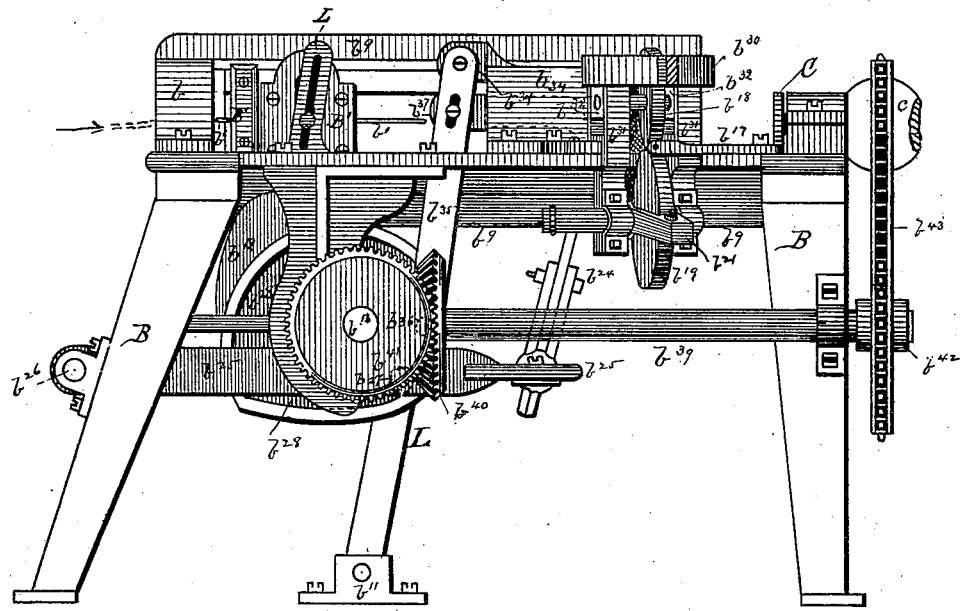
Figure 1A:
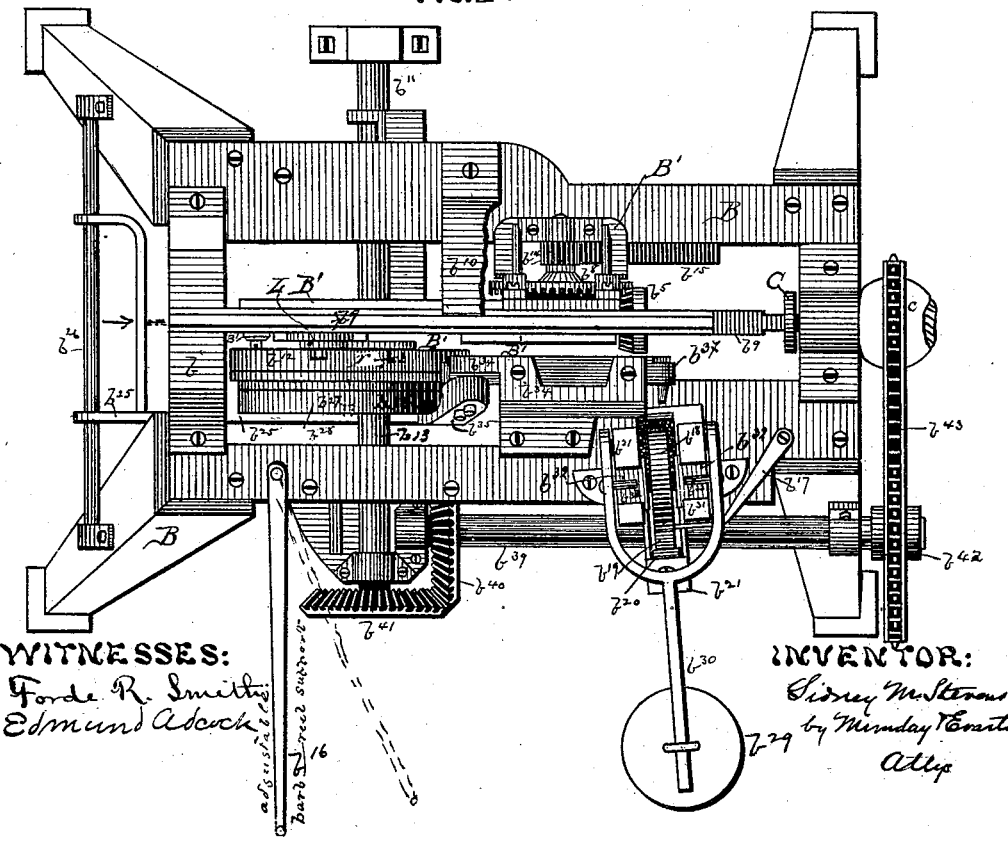
Figure 6:
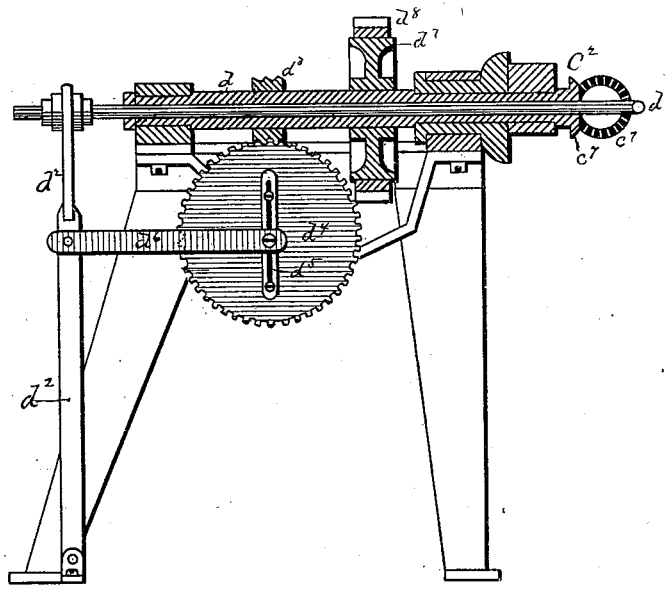
Figure 3:
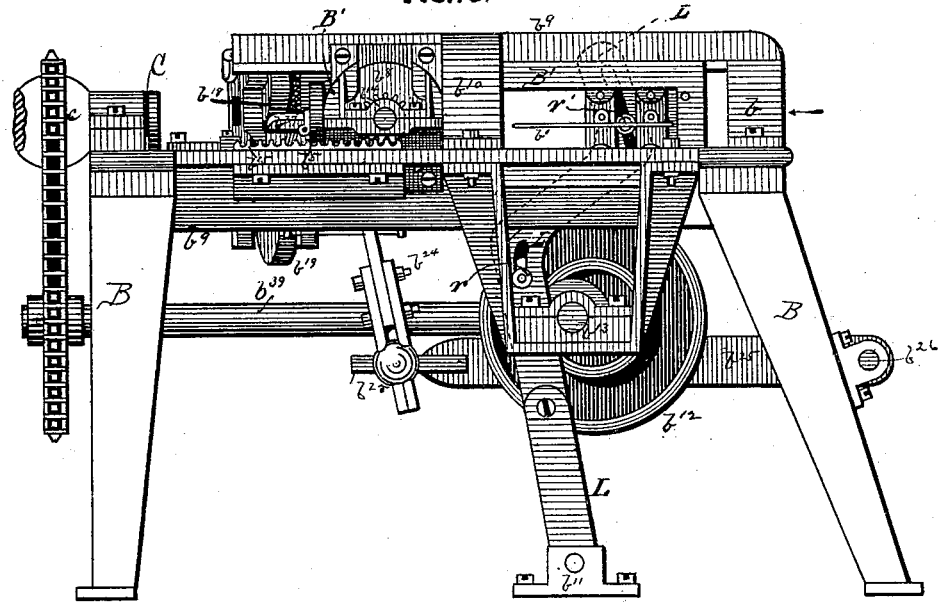

Figures 1, $1^a$, 2, $2^a$, 3, and 4 represent the barbing mechanism, the several figures being views, Fig. 1 in horizontal section and plan; Fig. $1^a$, in plan; Fig. 2, in vertical longitudinal section and elevation, (looking to the top of Figs. 1 and $1^a$, to the right of Fig. 4;) Fig. $2^a$, in eletion, (looking in the same direction as in Fig. 2;) Fig. 3, in elevation, (looking in the opposite direction;) and Fig. 4, in vertical cross-section and elevation, (looking to the left in Figs. 1 and 2.) Figs. 5, $5^a$, and 6 represent the twisting and spooling mechanism, Fig. 5 being an elevation, Fig. $5^a$ a plan, and Fig. 6 a view in vertical longitudinal section and elevation, (looking in opposite direction from the view shown in Fig. 5.) Figs. 7 to 17 are detail views of different parts, Figs. 7 and 8 of the holder for the main fence-wires and the coiler for winding the barbs thereon; Fig. 9, of the cam for operating the main wire-feeding and barb-applying mechanism; Fig. 10, of the cam for feeding the barb-wire and for severing the barbs therefrom; Figs. 11 and 12, of the devices for feeding the barb-wire; Figs. 13, $13^a$, and 14, of the cutters for severing the barb-wire; Fig. 15, of a guard through which the barbed wires pass to the twister and spooler; Fig. 16 of a brake forming part of the twister and spooler, and Fig. 17 of the barb-coiler and its carriage. Fig. 18 represents the twisted barbed fencing made by my improved machine. Fig. 19 is a view in elevation, showing the complete machine, but simplified by the omission of details. Figs. 20 and 21 are respectively an elevation and plan of a carriage and reels for holding the wires to be barbed.

The same letters indicate like parts on all the figures.

In describing my invention I shall take up the parts in the order, as near as may be, in which they operate upon the material from which the fencing is constructed, and first the parts carrying the reels from which the fence strands or wires are drawn. These consist, as shown in Figs. 20 and 21, of a stand, A, having inclined rails or tracks $a$, whereon run rollers $a'$, carrying the reel-carriage $a^2$. The reels $a^3$—one for each wire of the fencing—revolve in bearings in the standards $a^4$ at either end of the carriage. To give the proper tension to the wire, brakes are applied to the reels as follows: Each reel-shaft is provided at one end with a pulley, $a^5$. At the center, upon one side of the carriage, is another standard, $a^6$, hinged to which are two levers, $a^7$, one extending forward and the other backward, and each resting upon one of the pulleys $a^5$, and each lever is weighted with an adjustable weight, $a^8$.

The purpose of the inclined track or table is to give such movement to the carriage as will cause it to take up any slack in the wire automatically, and this it does by rolling back after every forward impulse of the wire.

Bearing-surfaces $a^9$, conforming to the peripheries of the pulleys, may be provided upon the levers $a^7$, if desired. From the reels the wires pass to the mechanism for applying the barbs and for impelling it forward. This mechanism is supported upon the proper frame-work B. The wires pass in under the bridge-piece $b$, and are kept apart by the horizontal dividing-plate $b'$ (one wire passing above and the other beneath said plate) until they enter a hollow non-revolving shaft, $b^2$. The farther end of this shaft is closed by two hemispherical keys, $b^3$, which are slotted upon their opposing surfaces to form openings, through which the wires may pass, such openings serving to separate the main wires a sufficient distance to permit the insertion between them of the barb-wire, and being but little larger than the main wires, so as to hold the latter against lateral play. The farther end of the shaft $b^2$ also serves as a bearing for the mandrel $b^4$, carrying the devices for coiling the barb about the wires. These devices are the wheel $b^5$, bevel-geared at the back and carrying upon the projecting rim or flange of the other side a pierced projection, $b^6$, and a roller, $b^7$, and they are revolved by the bevel-gear $b^8$ meshing into the gear of wheel $b^5$. All the parts $b'$ $b^2$ $b^3$ $b^4$ $b^5$ $b^6$ $b^7$ $b^8$ are held in a reciprocating carriage, B', traveling upon guides $b^9$, one above and the other below, the former supported by the arm $b^{10}$ and the bridge-piece $b$ and the latter held between the ends of the frame. This reciprocation is imparted by a lever, Z, pivoted at its lower end upon the shaft $b^{11}$, and actuated by a roller, $r$, working in the grooved cam $b^{12}$, keyed on a shaft, $b^{13}$, supported from the frame-work B. Upon the same shaft with the bevel-gear $b^8$ is a spur-gear, $b^{14}$, which meshes into a rack, $b^{15}$, upon the frame of the machine. It will thus be obvious that when the carriage B' is moved back and forth the spur-gear will be rotated and a corresponding rotation given the coiling mechanism through the intervening gearing.

The keys $b^3$ may be secured by a set-screw, $v$, passing through the shell of the shaft $b^2$ at the part within the projecting flange of the coiling-wheel $b^5$, or in any other desired manner. I use two keys, divided as shown and described, because they can be easily removed when it is desired to begin operations upon new coils of wire.

The barb-wire is fed from the reel-supporting arm $b^{16}$, which is adjustable as to position. From the reel the wire passes through the opening in the guide $b^{17}$ and between the tension-roller $b^{18}$ and feed-wheel $b^{19}$. This feed-wheel is intermittently actuated by a friction-brake consisting of a small roller, $b^{20}$, held between the surface of the wheel and the inclined face of the arm $b^{21}$, as shown in Figs. 4 and 12, the arm being so made as to substantially confine the roller and prevent its accidental escape. When the arm moves upward this roller binds the wheel and carries it along with it; but when the arm falls the roller is loosened in its compartment and rolls easily down, leaving the wheel at the point to which it was carried in the upward movement. The arm $b^{21}$ is forked and pivoted upon the shaft $s$, upon which the feed-wheel revolves, and the latter is loose thereon.

Reaching backward from the shaft $s$, and rigidly attached thereto, are two arms, $b^{22}$, connected by a cross-brace, $b^{23}$, on the latter of which is pivoted the upper end of a bar or connecting-arm, $b^{24}$, extending down and swinging upon a pivot adjustably held in the rock-lever $b^{25}$, which is hung upon the shaft $b^{26}$, attached to the rear end of the frame, as shown. The lever $b^{25}$ is actuated by a roller, $b^{27}$, attached to it and working in the grooved cam $b^{28}$ upon the shaft $b^{13}$, before mentioned, and adjoining the cam $b^{12}$, back to back. The revolution of this cam works the lever up and down, and such movement, or so much thereof as is desired, depending upon the adjustment of the pivot connecting it with the arm $b^{24}$, is communicated to the shaft of the feed-wheel through the medium of the arms $b^{22}$ and $b^{24}$ and the brace $b^{23}$. In this manner the feed-wheel is caused to revolve sufficiently far to propel the barb-wire forward the length of the uncoiled barb. The tension-roller is held to its work by a weight, $b^{29}$, adjustable upon the lever $b^{30}$, the forked ends of which are pivoted in the back of the standards $b^{31}$, such standards being slotted downward for the reception of the boxes $b^{32}$, in which the shaft of the tension-roller revolves. The pressure of the weight is communicated to the boxes by the pins $b^{33}$, projecting inward and resting upon the boxes, which are free to rise and fall in the slots. When the barb has thus been pushed forward the length of an uncoiled barb it is severed with a diagonal cut, thus giving it sharp points, by automatic devices now to be described. These devices are placed parallel with the line of fencing-wires, so as to approach the barb-wire at right angles as near as may be. Pivoted to a standard, $b^{34}$, attached to the frame of the machine, as shown, is a downwardly-extending lever, $b^{35}$, carrying a roller, $b^{36}$, also working in the grooved cam $b^{28}$ already described. This cam swings the lever upon its pivot at intervals. When swung the lever reciprocates with it the knife or shearing implement $b^{37}$, which slides in suitable guideways provided for it upon the standard $b^{34}$, the steel points between which the cutting is done being indicated by $b^{38}$, and the lower one of them being stationary in the standard.

It will be noticed that the cutting carriage and knives are in a plane slightly oblique to the horizontal. The purpose of this is that the cut of the wire may be oblique in the same degree.

At $b^{39}$ is a shaft attached to the side of the frame, carrying at one end a bevel-gear, $b^{40}$, meshing into a like gear, $b^{41}$, upon the cam-shaft $b^{13}$, heretofore mentioned, and upon its other end a drive-wheel, $b^{42}$. This drive-wheel receives power through the drive-chain $b^{43}$, and through it are set in motion all the parts of the machine thus far described.

C is a hollow shaft, carrying the pulley $c$ and having a bearing in a box upon the end of the frame B. It is turned by a belt running on the large pulley $C^3$. From the pulley $c$ power is communicated to the wheel $b^{42}$ through the drive-chain $b^{43}$, above mentioned.

The spooling-frame C' is supported at one end by the shaft C (the arms being attached to the inner periphery of pulley $C^3$) and at the other by the hollow mandrel $C^2$, itself turning in bearings in the frame D.

The wires of the fencing, after issuing from the barb-coiling mechanism already set forth, are passed through the hollow shaft C into the spooling-frame, and immediately after entering the same they are passed between two converging hinged jaws, $c'$, which at all times are pressed toward each other by the springs $c^2$. These jaws act as a guard against any backlash of the wires, as will be obvious, while they do not impede the forward movement thereof at all. One of these jaws is provided with a loop at its lower corner and the other with a tongue correspondingly placed, so that the tongue may work through the loop and serve as a guide to the jaws in their movements.

$C^4$ is a brace extending across the spooling-frame, provided at the center with a guide and support for the fence-cable, consisting of four fluted rollers, $c^3$, two of which are placed horizontally with the frame and the others vertically therewith. The cable passes between these rollers without injury to the barb-points.

$C^5$ is a moving guide, designed to so direct the cable that it will be evenly wound upon the spool. It is hinged upon a cross-brace, $c^4$, and actuated by means which will be presently specified.

$C^6$ is the spool. This is journaled in bearings in the frame $C'$, and deriving its motion from the hollow mandrel $C^2$ through a friction-connection and intermediate gearing. Inside the hollow mandrel $C^2$ and in frictional contact therewith is a sleeve or hollow shaft, $d$, which is connected with one of the journals of the spool $C^6$ by the bevel-gears $c^7$, a short cross-shaft, a sprocket-wheel on said cross-shaft, a drive-chain, $c^6$, and a sprocket-wheel on said journal. The spool is connected with the latter by a clutch, $c^5$, which allows the spool to be removed and replaced as desired.

The hollow shaft $d$ is supported at the opposite end from the hollow mandrel $C^2$ in a bearing on the frame D. In order to regulate the power conveyed to the spool, a brake is applied to the hollow shaft or sleeve $d$. This brake acts upon a pulley, $d^7$, keyed to the hollow shaft $d$, and comprises a divided or forked lever, $d^8$, hinged at $d^9$ to the frame D, and having its two arms jointed together, and the outer one loaded with a weight adjustable nearer to or farther from the fulcrum to vary the pressure of the brake on the pulley $d^7$.

In order to distribute the barbed fencing on the spool, the following devices are employed:

Extending entirely through the hollow of the shaft $d$ is a rod, $d'$, one end whereof is bent and pivoted to an arm at the base of the moving guide $C^5$, and at the other end it is encircled by a lever, $d^2$, pivoted at the bottom of frame D or upon the floor.

Mounted upon the shaft $d$ is a small worm-gear, $d^3$, meshing into the teeth of a wheel, $d^4$, mounted upon a transverse shaft suspended below in the frame D. Upon one face of the wheel $d^4$ is a slot, $d^5$, (shown in Fig. 6,) wherein is secured by a bolt a cross-bar, $d^6$, and connecting with the lever $d^2$ and actuating the same. The movement thus given to the lever $d^2$ is carried through the intervening parts to the moving guide $C^5$, which is thereby caused to perform its assigned function. The connecting-bar $d^6$ may be placed in different positions in the slots $d^5$, and thus the range of movement of the guide be regulated.

The operation of the machine is as follows: The reels containing the main fence-wires being placed on the carriage $a^2$, the said wires are passed under the bridge-piece $b$, thence one over and one under the dividing-plate $b'$ to and through the shaft $b^2$ and holes in the keys $b^3$, thence through the shaft C, between the jaws $c'$ and two sets of guide-rollers, $c^3$, to the spool $C^6$, to which the ends are secured. The reel of wire from which the barbs are to be made is placed on the support $b^{16}$ and the end is led through the eye in guide $b^{17}$, between the feed-roller $b^{19}$ and tension-roller $b^{18}$, under the cutter $b^{37}$, and past the steel-cutting points $b^{38}$. The brakes on the carriage $a^2$ and the brake $d^8$ being properly adjusted and the machine started, the main fence-wires are held by the balanced tension of the carriage $a^2$ or delivering apparatus, and the spool acting in opposite directions, the weight of the carriage $a^2$ and the brakes thereon acting to resist the tension of the spool due to the friction-bearing between the constantly-rotating mandrel $C^2$ and the hollow shaft or sleeve $d$, and modified by the action of the brake $d^8$. At the proper moment (the barbing mechanism being in the position shown in Figs. 1, 2, and 3) the lever $b^{25}$ is depressed by the cam $b^{28}$, and through the intermediate connections advances the barb-wire the length of a barb, pushing it through the pierced projection $b^6$ on the wheel $b^5$ and between the main fence-wires. Immediately after the barb-wire has been advanced the barb is severed by the movement of cutter $b^{37}$ imparted by the cam $b^{28}$ through the lever $b^{35}$. The carriage B' then begins its forward movement under the action of the cam $b^{12}$ and lever L. As the carriage advances the barb-coiler, consisting of the wheel $b^5$ and pierced projection $b^6$, is rotated by the travel of the gear $b^{14}$ and engagement thereof with the stationary rack $b^{15}$. The action of the coiler is to coil the cut end of the barb around the main fence-wires, and as soon as the barb is turned sufficiently to bind on the main fence-wires the latter are advanced with the coiler and its carriage B', the back tension of the delivery apparatus being relieved, and the friction between the mandrel $C^2$ and the hollow shaft $d$, being now sufficient to rapidly wind up the fencing as fast as it is fed forward. The barb is coiled spirally around the main fence-wires. The latter are twisted between the keys $b^3$ and the entrance of the spooling-frame. The twisting proceeds constantly, while the feed of the main fence-wires is intermittent.

The guide $C^5$ distributes the fencing evenly on the spool. In practice the weight on the brake-lever $d^8$ is changed as the fencing accumulates on the spool, in order to regulate the tension of the spool on the main fence-wires.

The travel of the carriage B' can be regulated by adjusting the position of the roller r' toward and away from the end of lever L.

Having now fully described my said invention and the manner of carrying the same into effect, I would observe, in conclusion, that no claim is made herein to the spooling and twisting apparatus shown and described, nor to the barbed fencing itself, as I reserve the right to protect the same by separate Letters Patent; but I do claim the new improvements herein described, all and several, in delivering apparatus and barbing mechanism, and in the combination of them with each other and with the spooling and twisting apparatus—that is to say,

I claim—

1. In a machine for making barbed-wire fencing, mechanism constructed to simultaneously feed the main fence-wires and apply the barbs thereon, in combination with means for operating said mechanism, substantially as described.

2. The combination, in a machine for making barbed-wire fencing, of mechanism for feeding the barb-wire and mechanism for cutting said barb-wire to form the barbs with mechanism constructed to simultaneously feed the main fence-wires and apply the barbs thereto, substantially as described.

3. The combination of a non-rotating wire-holder having two or more apertures for the main wires with a coiling-cylinder rotating on the said holder, substantially as set forth.

4. The combination, with supports for the main fence-wires, of automatic mechanism for inserting the barbs between said wires and mechanism for catching one end of the several barbs and coiling said end around said fence-wires, substantially as described.

5. The combination, with supports for the main fence-wires, of automatic mechanism for inserting barbs between the said main wires, and mechanism for catching one end of the several barbs and coiling said end around both said main wires, and mechanism for twisting the latter between the barbs, substantially as shown and set forth.

6. A coiling-wheel provided with a pierced projection for receiving the barb, substantially as described.

7. The combination, with the hollow shaft $b^2$, of the slotted keys $b^3$, substantially as described.

8. The combination, with the rotating and reciprocating coiling mechanism, of the gearing $b^{15}$ upon the frame and the intervening devices, whereby the reciprocating motion of the coiling mechanism is made to rotate the same, substantially as set forth.

9. The inclined track-stand, in combination with the reel-carriage and its rollers, substantially as specified.

10. The combination, with the feed-wheel $b^{19}$, of the friction-brake, consisting of the arm pivoted upon the axis of the wheel and having an inclined surface opposed to the periphery of the wheel, and the small roller interposed between such inclined surface and the periphery, substantially as described.

11. The combination of a delivery apparatus comprising a carriage supporting the wires to be barbed and mounted on inclined ways, a spooling apparatus comprising a spool journaled in bearings, a continuously-revolving power-shaft, means for conveying power from said shaft to said spool through a friction-connection, and means for regulating or adjusting the power conveyed to said spool, and a barbing apparatus comprising main wire-feeding and barb-applying mechanism and means for operating said mechanism, substantially as described, whereby the main fence-wires are constantly stretched by the balanced tension in opposite directions of the said delivery and spooling apparatus, and the barbed wires are rapidly wound upon said spool as the main wires are advanced and the barbs applied thereto, substantially as set forth.

SIDNEY M. STEVENS.

Witnesses:
THOS. H. HUTCHINS,
W. H. BULLOCK.